UNITED STATES PATENT OFFICE 2,553,494

MEROCYANINE DYES CONTAINING AN ARYLOXY-, ARYLTHIO-, OR ARYLSELENOALKYL GROUP ATTACHED TO ONE OF THE NITROGEN ATOMS THEREOF

Alfred W. Anish, Vestal, N. Y., assignor to General Aniline & Film Corporation, New York, N. Y., a corporation of Delaware No Drawing. Application April 12, 1950, Serial No. 155,548

6 Claims. (Cl. 260—240.4)

This invention relates to new dyes of the merocyanine type containing a new group attached to the nitrogen atom of one of its nitrogenous heterocyclic nuclei.

It is well known that the type of group attached to the cyanine nitrogen atoms in cyanine dyes exert an influence on the properties of the dye. For example, it has been known for some time that where there is an alkyl group attached to the cyanine nitrogen atom, the maximum intensity of sensitization is reached with the ethyl or propyl group and that the sensitization decreases when the number of carbon atoms in the alkyl group is increased.

It is also known that many cyanine dyestuffs, containing a hydroxyalkyl, alkoxyalkyl, acyloxyalkyl, benzyl, β-ethoxyethyl, and similar groups as substituents on one or two of the cyanine nitrogen atoms, have been utilized in the photographic art as sensitizing dyes. Although such dyes are satisfactory from the standpoint of solubility and sensitivity, they are deficient from the standpoint of diffusibility in multilayer film coatings. Thus, the hydroxyalkyl group is hydrophilic and promotes water solubility, but does not prevent diffusion. Inasmuch as such groups do not prevent diffusion, it has been proposed by Wilmanns et al. in United States Patent 2,186,849 to introduce hydrophobic groups into the dye molecules. Unfortunately, the introduction of such substituents changes the dye molecule to an extent which causes a modification of the sensitizing characteristics.

It is recognized in the art that the greater the molecular weight of the substituent on a cyanine dye, whether it be on the cyanine nitrogen atom, polymethine chain or azole nucleus, the lower its solubility, discounting, of course, the presence of solubilizing groups. Hence, if a sensitizing dye is deficient from the standpoint of diffusibility and satisfactory from the standpoint of solubility, a change in the size of the dye molecule to cure the deficiency causes a lessening of solubility.

It is an object of the present invention to provide a new class of merocyanine dyes containing an aryloxyalkyl, arylthioalkyl, and arylselenoalkyl groups attached to the nitrogen atom of one of their nitrogenous heterocyclic nuclei.

Other objects and advantages of this invention will become apparent by reference to the following specification, in which its preferred details and embodiments are described.

I have discovered that by condensing an N-aryloxyalkyl, N-arylthioalkyl, or N-arylselenoalkyl heterocyclic dye salt having a reactive methyl group in α- or γ-position to the nitrogen atom thereof with a 5- or 6-membered ketoheterocyclic compound containing a reactive group, new merocyanine dyes are obtained which do not lose their power of sensitization nor are they affected in speed. Moreover, such dyes do not wander or diffuse when they are utilized in multilayer color photographic coatings, nor are they displaced from the layers by the color formers present therein.

The merocyanine dyes prepared according to the present invention are characterized by the following general formula:

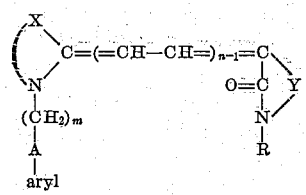

wherein A is selected from the group consisting of O, S, and Se, $m$ is a numeral ranging from 2 to 3, $n$ is a numeral ranging from 1 to 3, R is a member selected from the class consisting of an alkyl group, e. g., methyl, ethyl, propyl, butyl, amyl, isoamyl, hexyl, and the like, allyl, or aryl group, e. g., phenyl, naphthyl, diphenyl, etc., X represents the atoms necessary to complete a 5- or 6-membered heterocyclic nitrogenous nucleus of the type used in cyanine dyes, such as benzoxazole, benzothiazole, benzoselenazole, methylenedioxybenzoxazole, indolenine, naphthoxazole, naphthothiazole, oxazole, oxazoline, pyridine, quinoline, selenazole, selenazoline, thiazoline, thiodiazole, and the like, and Y represents the atoms necessary to complete a 5- or 6-membered ketoheterocyclic nucleus, e. g., a barbituric acid, a thiobarbituric acid, a rhodanine, an oxazoledione, a thiazolone, a pyrazolone, a hydantoin, a thiohydantoin, a thiophenone, and the like. The aryl group joined to A is either a phenyl or naphthyl group, or a phenyl group substituted by a methyl, methoxy, or a branched aliphatic chain, such as isopropyl, isobutyl, di-isopropyl, di-isobutyl, tert.-butyl, and the like; or cycloaliphatic, such as cyclohexyl, and the like.

The process of preparing the above merocyanine type dyes comprises heating, preferably under reflux, in the presence of a tertiary base, an alcoholic solution of a quaternary cyclammonium salt characterized by the following general formula:

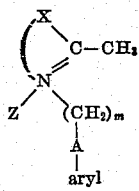

with a 5- or 6-membered ketoheterocyclic compound characterized by the following general formula:

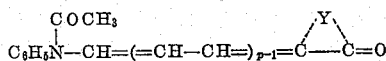

wherein A, m, X and Y have the same values as above, p is a numeral ranging from 1 to 3, and Z represents an anionic acid radical, e. g., Cl, Br, I, ClO$_4$, SO$_4$CH$_3$, SO$_4$C$_2$H$_5$, SO$_3$C$_6$H$_4$CH$_3$, and the like.

The quaternary cyclammonium dye salts used in the preparation of the new dyes are described in my United States Patents 2,481,464 of September 6, 1949, and 2,496,842 of February 7, 1950.

The 5-membered ketoheterocyclic intermediates derived from a rhodanine, a thiazolone, a hydantoin, and the like are described in United States Patent 2,186,608.

As illustrative of ketoheterocyclic compounds represented by the foregoing formula, reference is made to:

4-(γ-acetanilidopropenylidene)-1-(2 - benzothiazolyl)-3-methyl-5-pyrazolone
4-acetanilidomethylene-3-methyl - 1 - phenyl-5-pyrazolone
4-(γ - acetanilidopropenylidene) - 3 - methyl-1-phenyl-5-pyrazolone
4-acetanilidomethylene-3-methyl-1-(2-pyridyl) - 5-pyrazolone
3-acetanilidomethylene-5-methyl-thiophen-2-one
5-acetanilidomethylene-3-allylrhodanine
5-(γ-acetanilidopropenylidene)-3-allylrhodanine
5-acetanilidomethylene-3-phenylrhodanine
5-acetanilidomethylene-3-ethylrhodanine
5-acetanilidomethylene-3-ethyl-2-thio - 2,4(3,5) - oxazoledione
5-(γ - acetanilidopropenylidene)-2-diphenylamino-4(5)-thiazolone
5-(γ - acetanilidopropenylidene)-3-ethyl-2-thio-2,4(3,5)-oxazoledione
5-(γ - acetanilidopropenylidene)-3-ethyl-1-phenyl-2-thiohydantoin
5-(5-acetanilido-Δ$^{2,4}$-pentadienylidene)-3-ethylrhodanine
5-(γ-acetanilidopropenylidene) - 2,4,6 - triketohexahydropyrimidine
5-(γ-acetanilidopropenylidene)-2-thio - 4,6 - diketohexahydropyrimidine, and the like.

The merocyanine type dyes may also be prepared by condensing a quaternary cyclammonium dye salt containing in place of the reactive methyl group in α- or γ-position to the nitrogen atom thereof a reactive anilinovinyl, acylanilidovinyl, e. g., acetanilidovinyl, etc., alkylthio, e. g., methylthio, ethylthio, arylthio, e. g., phenylthio, etc., alkyl- or arylthiovinyl, e. g., ethylthiovinyl, phenylthiovinyl, and the like or halogenovinyl group, e. g., 2-chlorovinyl, 2-bromovinyl, etc., with an N-substituted 5- or 6-membered ketomethylene heterocyclic compound of the type commonly employed in merocyanine dyes and characterized by the following general formula:

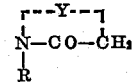

wherein R and Y have the same values as above.

The quaternary cyclammonium dye salts containing anilinovinyl, acylanilidovinyl, etc., reactive groups are described in my United States Patent 2,496,842.

As typical examples of the N-substituted 5- or 6-membered ketomethylene compounds, the following may be mentioned:

3-ethylrhodanine
3-allylrhodanine
3-phenylrhodanine
3-benzylrhodanine
3-methyl-4-keto-2-thiotetrahydroxazole
3-phenyl-4-keto-2-thiotetrahydroselenazole
3-propyl-4-keto-2-selenotetrahydrothiazole
1-phenyl-3-methyl-5-pyrazolone
1-methyl-5-pyrazolone
1,3-dimethyl-5-pyrazolone
1,3-diphenyl-5-pyrazolone
3-phenyl-2,4-thiazoledione
2-diphenylamino-3-ethyl-4(5)-thiazolone
3-ethyl-2-thio-2,4(3,5)-oxazoledione
3-ethyl-1-phenyl-2-thiohydantoin
2,4,6-triketohexahydropyrimidine
2-thio-4,6-diketohexahydropyrimidine, and the like.

The following alcohols may be employed as solvent-diluent in the condensation reaction: methanol, ethanol, propanol, butanol, benzylalcohol, furfuryl alcohol, and the like. Triethylamine, tributylamine and the like are representative of the tertiary bases which may be employed as the catalyst.

The following examples describe in detail the methods for accomplishing the above objects, but it is to be understood that they are inserted merely for the purpose of illustration and are not to be construed as limitative.

*Example I*

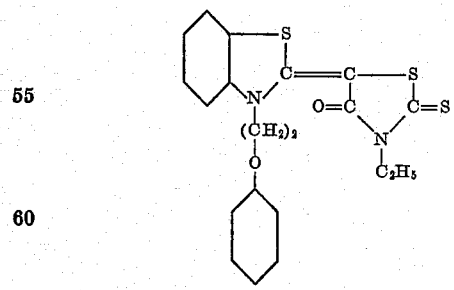

A mixture of 4.73 grams of 2-methylmercaptobenzothiazole β-phenoxyethyl p-toluenesulfonate, 1.61 grams of 3-ethylrhodanine, and 0.35 gram of triethylamine dissolved in 30 cc. of absolute ethanol was refluxed on a steam bath for about 1 hour, during which time the dye separated from the hot alcohol. The mixture was filtered while hot and the filter residue boiled out twice with 50 cc. portions of methanol. The dye was purified by dissolving in dioxane and precipitating with 95% alcohol.

Example II

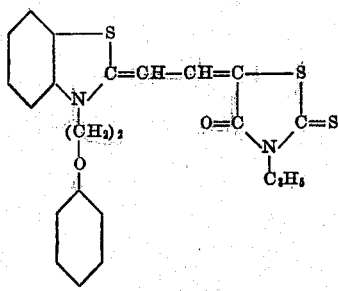

Two grams each of 2-methylbenzothiazole β-phenoxyethyl p-toluenesulfonate and 3-allyl-5-acetanilidomethylenerhodanine were dissolved in 50 cc. of hot isopropanol and 0.5 cc. of triethylamine added. The mixture was refluxed for 30 minutes and the crystals of dye which formed on cooling the reaction mixture were filtered. The dye was purified by dissolving in dioxane and precipitating with 95% ethyl alcohol. It has a melting point of 234° C.

Example III

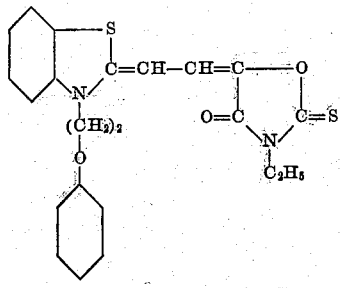

Equimolecular proportions of 5-(γ-acetanilidopropenylidene)-3-ethylrhodanine and 2-methyl-6-methoxy-benzoselenazole β-phenoxyethyl p-toluenesulfonate were condensed as in Example II.

Example IV

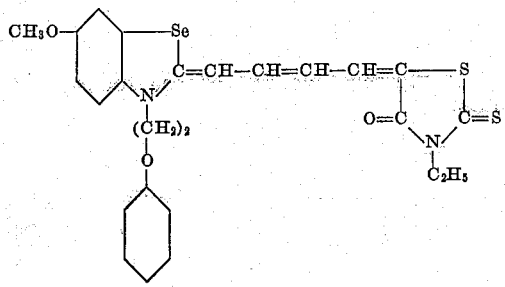

The procedure of Example II was followed except that the 3-allyl-5-acetanilidomethylene rhodanine was replaced by an equivalent amount of 5-acetanilidomethylene-3-ethyl-2-thio-2,4(3,5)-oxazolidone.

Example V

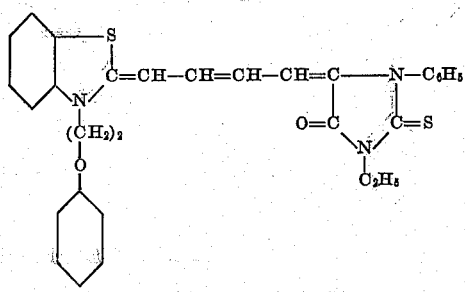

When 5-(γ-acetanilidopropenylidene)-3-ethyl-1-phenyl-2-thiohydantoin is employed as the ketomethylene compound following the procedure of Example II, the dye of the above formula is obtained.

Example VI

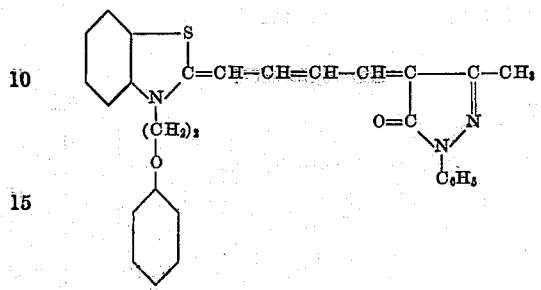

When 4-(γ-acetanilidopropenylidene)-3-methyl-1-phenyl-5-pyrazolone is employed as the ketomethylene compound following the procedure of Example II, a dye having the above formula is obtained.

While the present invention has been described in considerable detail to a new class of merocyanine type dyes, it is to be understood that the rhodacyanine and rhodacarbocyanine dyes can be very readily prepared from the dyes prepared in accordance with the foregoing examples. For example, the merocyanine type dyes which contain a rhodanine, hydantoin, oxazoledione nucleus, as illustrated in Examples I to V, may be further treated with a quaternizing compound, such as dimethyl sulfate or methyl iodide. The quaternized compound is then condensed under reflux with a quaternary cyclammonium heterocyclic base or dye salt usual in cyanine dyes, such as 3-methyl-2-methylbzenzothiazole ethiodide having a reactive methyl group in α-position to the nitrogen atom in the presence of a condensing agent, such as pyridine, quinoline, and the like. In the first reaction (alkylation), the merocyanine dye is modified to the extent that the nitrogen atom in the 3-position of the rhodanine, hydantoin, or oxazoledione ring is quaternized and the sulfur atom in the 2-position is converted to a thioether group. In the second reaction (condensation), the alkylated merocyanine dye is condensed with a quaternary cyclammonium base or salt whereby rhodacyanine and rhodacarbocyanine dyes are obtained.

The following examples are illustrative of the preparation of such dyestuffs:

Example VII

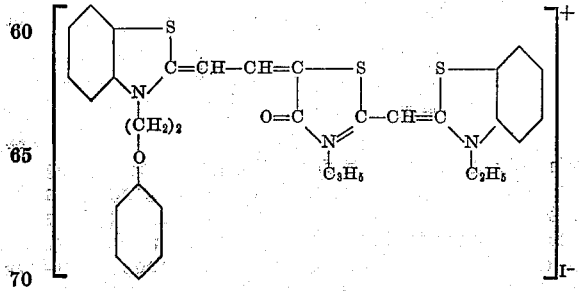

Five-tenths gram of the dye prepared in Example II was mixed with 10 cc. of dimethyl sulfate and heated at 110° C. for 10 minutes. The mixture was chilled in ice water and a large excess of pyridine added, followed by 0.3 gram of 2-methylbenzothiazole ethiodide. The new mixture was refluxed for 30 minutes and then cooled. Upon adding 10 cc. of water and allowing to stand, a dye precipitated. The dye crystals which separated were filtered off and boiled out with a dioxane methanol mixture. The dye was recrystallized from methanol.

*Example VIII*

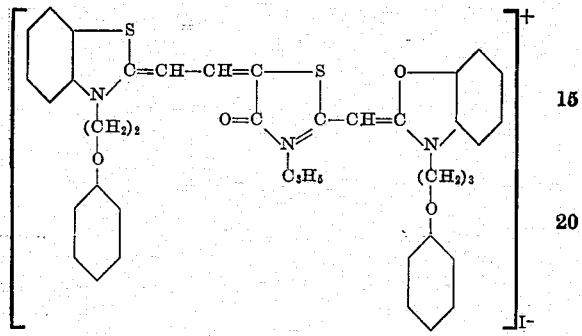

Instead of employing 2-methylbenzothiazole ethiodide as in Example VII, there is employed an equivalent amount of 2-methylbenzoxazole γ-phenoxypropyl p-toluenesulfonate.

*Example IX*

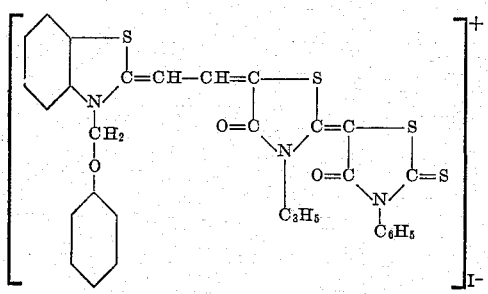

Instead of employing 2-methylbenzothiazole ethiodide as in Example VII, there is employed 3-phenylrhodanine.

This application is a continuation-in-part of my application Serial No. 638,496, filed on December 29, 1945, now United States Patent 2,504,615 of April 18, 1950.

I claim:

1. A merocyanine dye having the general formula:

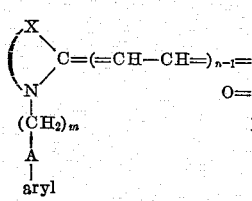

wherein A is selected from the group consisting of O, S, and Se, $m$ is a numeral ranging from 2 to 3, $n$ is a numeral ranging from 1 to 3, R is selected from the group consisting of alkyl, allyl, and aryl groups, X represents the atoms necessary to complete a heterocyclic nitrogenous nucleus of the type usual in cyanine dyes, and Y represents the atoms necessary to complete a member selected from the class consisting of 5- and 6-membered ketoheterocyclic ring system.

2. A merocyanine dye of the following formula:

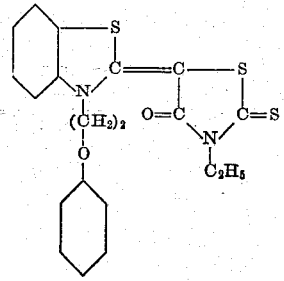

3. A merocyanine dye of the following formula:

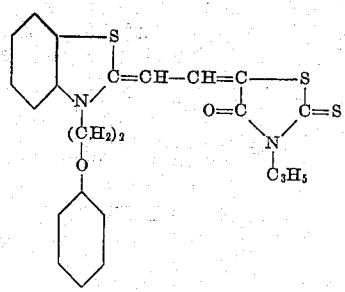

4. A merocyanine dye of the following formula:

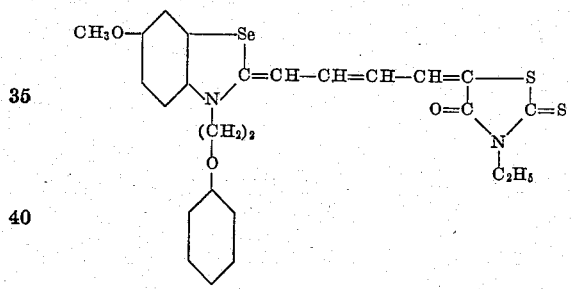

5. A merocyanine dye of the following formula:

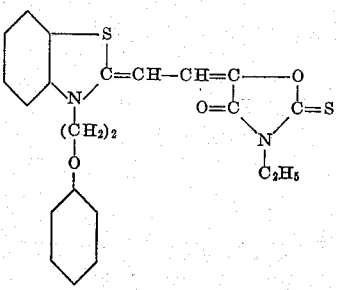

6. A merocyanine dye of the following formula:

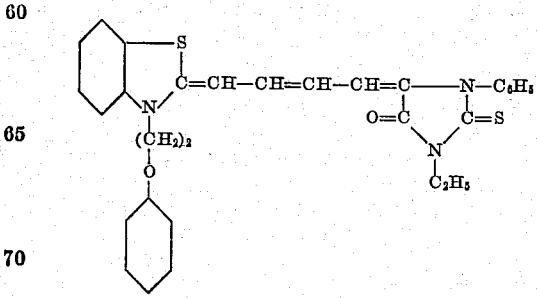

ALFRED W. ANISH.

No references cited.